(12) United States Patent
Mestroni et al.

(10) Patent No.: US 8,783,007 B2
(45) Date of Patent: Jul. 22, 2014

(54) LIQUID FUEL SYSTEM AND METHOD

(75) Inventors: Julio Enrique Mestroni, Atlanta, GA (US); Douglas Byrd, Greenville, SC (US); Charles Steber, Atlanta, GA (US); Rahul J. Chillar, Atlanta, GA (US); Robert R. Reed, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 966 days.

(21) Appl. No.: 12/773,053

(22) Filed: May 4, 2010

(65) Prior Publication Data

US 2011/0271679 A1 Nov. 10, 2011

(51) Int. Cl.
*F02G 3/00* (2006.01)
*C10L 10/00* (2006.01)

(52) U.S. Cl.
USPC .............................. 60/39.094; 431/3

(58) Field of Classification Search
USPC ................... 60/39.094, 734; 431/3
See application file for complete search history.

(56) References Cited

U.S. PATENT DOCUMENTS 7,730,711 B2 * 6/2010 Kunkle et al. .............. 60/39.094
2006/0150631 A1 * 7/2006 Smith et al. ................... 60/772

OTHER PUBLICATIONS

Author: GE Energy, Title: "Dual Fuel Gas Turbine Operational Best Practices & Troubleshooting Guide", dated Jun. 2007, pp. 1-22.

* cited by examiner

*Primary Examiner* — Phutthiwat Wongwian
*Assistant Examiner* — William Breazeal
(74) *Attorney, Agent, or Firm* — Sutherland Asbill & Brennan LLP

(57) ABSTRACT

The present application provides a liquid fuel system for use with a flow of a liquid fuel and a combustor of a gas turbine engine. The liquid fuel system may include a number of fuel lines in communication with the combustor, a purge air inlet positioned about each of the fuel lines, a number of drain lines with each drain line in communication with a respective fuel line, and a number of drain valves with each drain valve in communication with a respective drain line so as to drain the flow of liquid fuel in the fuel lines via a flow of purge air through the purge air inlet and opening the drain valves.

20 Claims, 3 Drawing Sheets

LIQUID FUEL SYSTEM AND METHOD

TECHNICAL FIELD

The present application relates generally to gas turbine engines with a flexible multi-fuel system and more particularly relates to a liquid fuel discharge system for use with a liquid and gas dual fuel system and the like.

BACKGROUND OF THE INVENTION

Modern gas turbine engines may offer fuel flexibility in that both gas and liquid fuels may be used and that the transfer from one fuel to the other may be accomplished while the engine is running at load. These liquid fuels may include distillate oils, light crude, bio-liquid fuels, and the like. The use of a diverse fuel spectrum provides increased operational flexibility, cost control, plant efficiency, and/or improved emissions characteristics.

Depending upon economic factors, geographic location, and/or availability, liquid fuels may be considered as a start-up or a "backup" fuel to the gas fuel. As such, the liquid fuels may not be in constant use. When a fuel flexible gas turbine is operating on a gas fuel, the liquid fuel lines generally remain full of fuel up to about the combustor fuel nozzles within the gas turbine compartment. If this condition exists for an extended period of time, the liquid fuel therein may undergo a process of decomposition and oxidation. This process may form gummy deposits and ultimately solid particles of coke. The decomposition process may be due to or accelerated by the relatively high temperatures surrounding the fuel lines in the gas turbine compartment. Decomposition may start in as little time as a few weeks or less.

When the liquid fuel lines become partially plugged with gummy and/or solid materials due to decomposition, a gas to liquid fuel transfer may fail due to the plugging of check valves, purge valves, and/or liquid fuel nozzles in the combustor. Repair of the plugged fuel lines, check valves, purge valves, and/or fuel nozzles may require a system outage and a complete teardown of the liquid fuel system for cleanup and replacement of the damaged and/or non-repairable components.

In order to avoid decomposition issues, relatively frequent gas to liquid and liquid to gas fuel transfers may be required. Other alternatives include the use of a liquid fuel recirculation system in which the liquid fuel is continuously recirculated through the liquid fuel lines via the use of special valves at each combustor. The liquid fuel thus may be maintained at a low enough temperature to prevent coking by being recirculated outside of the gas turbine compartment. Such recirculation, however, is somewhat complex and costly given attendant high operating and maintenance costs and also involves some parasitic pump loses. Similarly, the liquid fuel also may be removed from the liquid fuel lines by using a supply of a stored inert gas such as nitrogen to purge the liquid fuel lines back to regions where the temperature surrounding the liquid fuel lines are low enough to avoid decomposition. Such a system also involves complex and costly valves, control sequencing, and the cost of maintaining an adequate supply of nitrogen purge gas.

There is therefore a desire for an improved liquid fuel storage system. Such a system may provide a flow of liquid fuel on demand but also avoid decomposition issues caused by high temperatures and the like while limiting costs, complexity, and parasitic losses.

SUMMARY OF THE INVENTION

The present application thus provides a liquid fuel system for use with a flow of a liquid fuel and a combustor of a gas turbine engine. The liquid fuel system may include a number of fuel lines in communication with the combustor, a purge air inlet positioned about each of the fuel lines, a number of drain lines with each drain line in communication with a respective fuel line, and a number of drain valves with each drain valve in communication with a respective drain line so as to drain the flow of liquid fuel in the fuel lines via a flow of purge air through the purge air inlet and opening the drain valves.

The present application further provides a method of protecting a flow of liquid fuel in a fuel line from the heat produced by a combustor of a gas turbine engine when the fuel line is not in use. The method may include the steps of positioning a drain valve about the fuel line at an elevation that is less than the combustor, forcing a flow of purge air into the fuel line, opening the drain valve, and flowing the liquid fuel through the drain valve.

The present application further provides a purge air drain system for use with a flow of a liquid in a liquid line. The purge air system may include a purge air inlet positioned about the liquid line, a drain line in communication with the liquid line, and a drain valve in communication with the drain line so as to drain the flow of liquid in the liquid line via a flow of purge air through the purge air inlet and opening the drain valve.

These and other features and improvements of the present application will become apparent to one of ordinary skill in the art upon review of the following detailed description when taken in conjunction with the several drawings and the appended claims.

DETAILED DESCRIPTION

Figure 1:
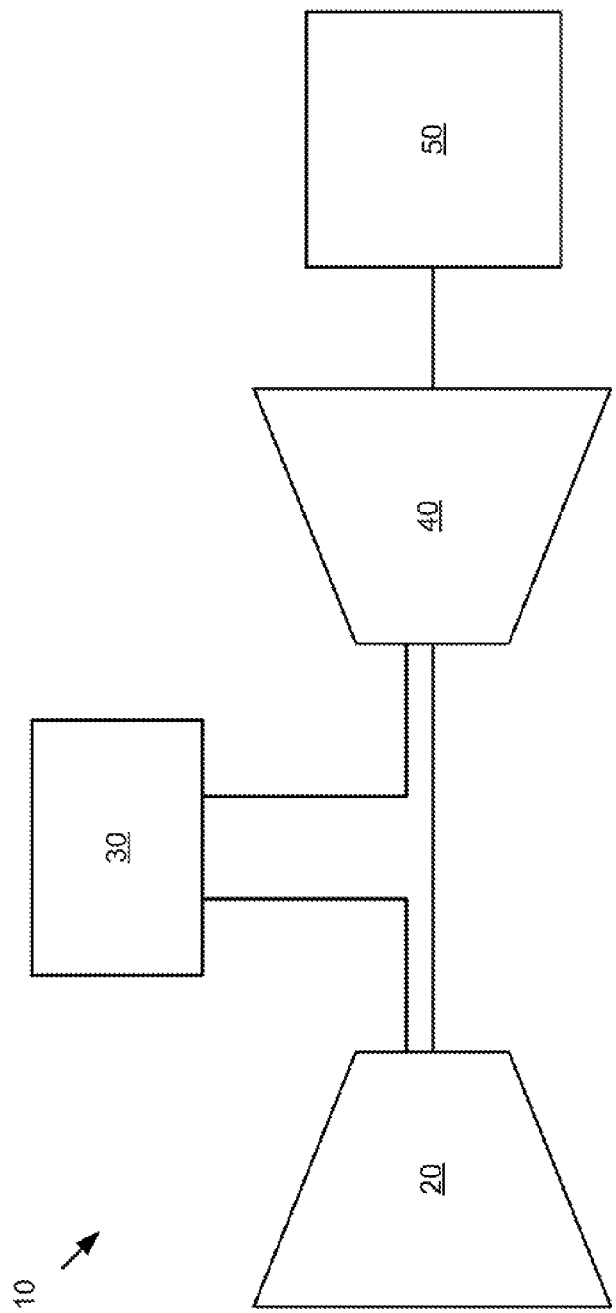
FIG. 1 is a schematic view of a gas turbine engine.

Referring now to the drawings, in which like numerals refer to like elements throughout the several views, FIG. 1 shows a schematic view of a gas turbine engine 10. As is known, the gas turbine engine 10 may include a compressor 20 to compress an incoming flow of air. The compressor 20 delivers the compressed flow of air to a combustor 30. The combustor 30 mixes the compressed flow of air with a compressed flow of fuel and ignites the mixture. Although only a single combustor 30 is shown, the gas turbine engine 10 may have any number of combustors 30. Hot combustion gases are in turn delivered to a turbine 40. The hot combustion gases drive the turbine 40 so as to produce mechanical work. The mechanical work produced in the turbine 40 drives the compressor 20 and an external load 50 such as an electrical generator and the like.

The gas turbine engine 10 may be an E-Class or F-Class heavy duty gas turbine engine offered by General Electric Company of Schenectady, N.Y. The gas turbine engine 10 may have other configurations and may use other types of components. Other types of gas turbine engines 10 also may be used herein. Multiple gas turbine engines 10, other types of turbines, and other types of power generation equipment may be used herein. Moreover, any type of device that utilizes a liquid subject to coking, such as a diesel driven compressor, may be applicable herein.

Figure 2:
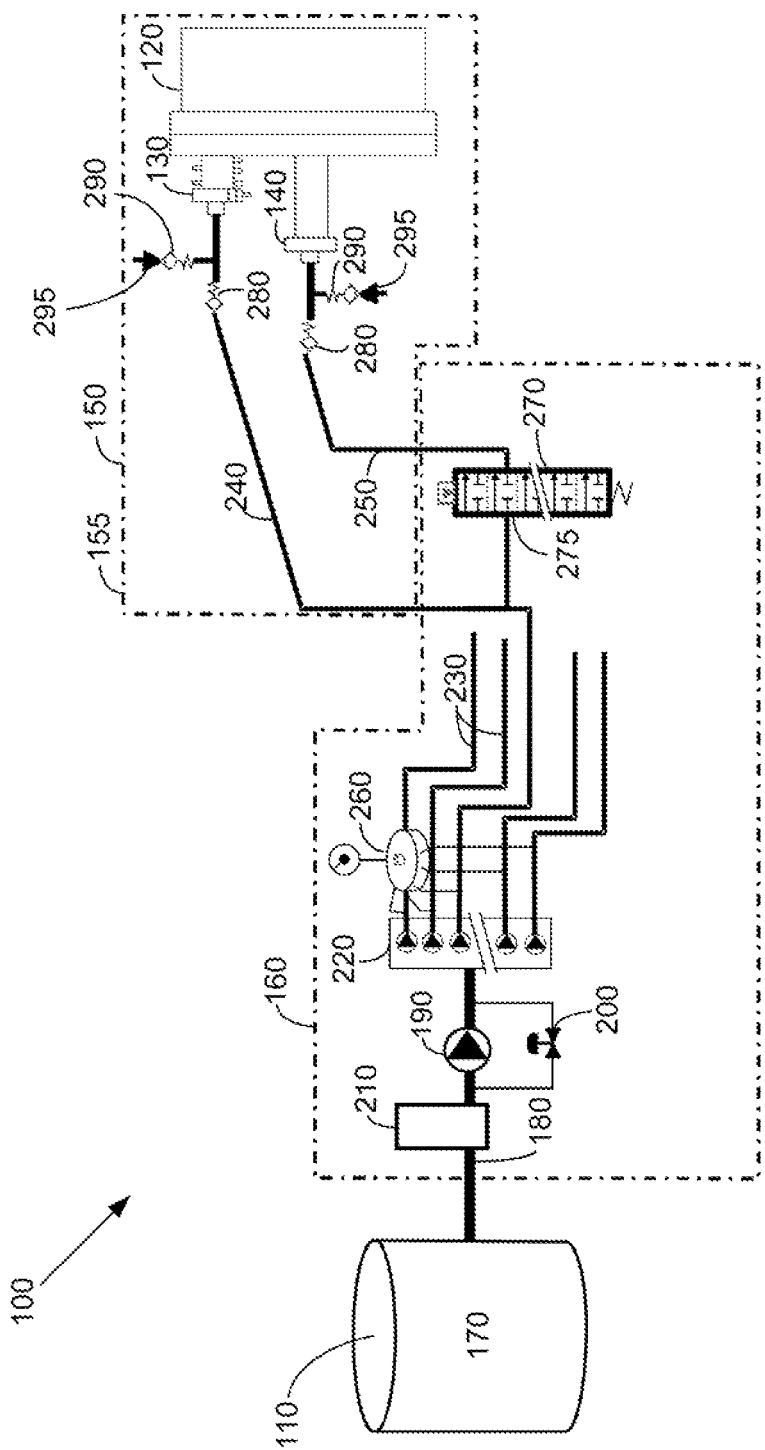
FIG. 2 is a schematic view of a known liquid fuel system.

FIG. 2 shows a known liquid fuel system 100. The liquid fuel system 100 provides a flow of liquid fuel 110 to one or more combustors 120. As described above, any number of individual combustors 120 may be used although the number of combustors 120 generally may range from about six (6) to about eighteen (18) depending upon the overall size of the gas turbine engine 10. In this example, fourteen (14) combustors 120 may be used. The combustors 120 may be a DLN-1 ("Dry Low $NO_x$") combustor offered by General Electric Company of Schenectady, N.Y. Other types of combustors 120 also may be used herein. Likewise, other types of heat generating sources also may be applicable herein.

Each combustor 120 may have a number fuel nozzles or fuel stages. In this example, a number of primary fuel nozzles may surround a secondary fuel nozzle. As such, each combustor 120 may have a primary nozzle intake 130 and a secondary nozzle intake 140. The combustors 120 may be positioned within a gas turbine compartment 150 along with the other components of the gas turbine engine 10. Other types of combustor configuration and fuel nozzle configurations may be used herein.

The liquid fuel system 100 may include a liquid fuel skid 160 in communication with the combustors 120. The liquid fuel skid 160 also may be in communication with a liquid fuel container 170 with the liquid fuel 110 therein. The liquid fuel container 170 may have any desired size or shape. The liquid fuel container 170 and the liquid fuel skid 160 may be spaced a distance apart from the gas turbine compartment 150 so as to avoid the heat generated therein. The gas turbine compartment 150 also may have an elevated position 155 as compared to the liquid fuel skid 160. Other configurations may be used herein.

The liquid fuel skid 160 may include an intake line 180 in communication with the liquid fuel container 170. The intake line 180 may lead to a fuel pump 190. The fuel pump 190 may have any desired size, shape, or capacity. A bypass line 200 with a bypass valve may be positioned about the fuel pump 190. A filter 210 also may be positioned about the intake line 180. The filer 210 may be of conventional design and may remove impurities from the flow of liquid fuel 110. Other types and configurations of the liquid fuel skid 160 may be used herein.

A flow divider 220 may be positioned downstream of the pump 190. The flow divider 220 divides the flow of liquid fuel 110 according to the number of combustors 120 in use. In the case of fourteen (14) combustors 120, the flow divider 220 may lead to fourteen (14) fuel lines 230. Any number of fuel lines 230 may be used herein. Each fuel line 230 in turn may split into a primary nozzle fuel line 240 and a secondary fuel line 250. Alternatively, twenty-eight (28) fuel lines 230 also may be used so as to provide the flow of fuel 110 to the nozzle intakes 130, 140 of each combustor 120. Other fuel line configurations may be used herein.

A selector valve 260 may be in communication with each of the fuel lines 230. Alternatively, the selector valve 260 may be in communication with each of the primary nozzle fuel lines 240 and the secondary nozzle fuel lines 250. The selector valve 260 monitors the pressure within each of the fuel lines 230. Other types of monitoring valve and/or any type of control valves may be used herein.

A staging shear valve 270 may be positioned about the secondary nozzle fuel line 250. The staging shear valve 270 may have a number of ports 275 therein in communication with each of the secondary nozzle fuel lines 250. The staging shear valve 270 provides intermittent closure when the secondary nozzle fuel line 250 is to be shut while the primary nozzle fuel line 240 remains open. Other types of control valves may be used herein.

Each of the primary fuel nozzle fuel lines 240 may be in communication with the primary nozzle intake 130 while each of the secondary nozzle fuel lines 250 may be in communication with each of the secondary nozzle intakes 140. Each of the fuel lines 240, 250 may include a check valve 280 and a purge air intake 290 positioned upstream of the intakes 130, 140. Other types of valves, such as a three way valve and the like, also may be used herein.

In use, the fuel lines 230, 240, 250 generally travel along the liquid fuel skid 160 and the floor of the gas turbine compartment 160 before traveling upward to the individual combustors 120 so as to limit the exposure to the heat within the gas turbine compartment 160. The temperature within the gas turbine compartment 150 about the combustors 120 may be in excess of about 250 degrees Fahrenheit (about 121 degrees Celsius). The flow of liquid fuel 110 is generally equal between the primary nozzle intake 130 and the secondary nozzle intake 140 other than when the staging shear valve 270 closes the secondary nozzle fuel lines 250. Any proportion, however, may be used.

When the combustors 120 switch from the flow of liquid fuel 110 to a flow of gas (gas lines not shown), the check valves 280 prevent an upstream flow of the hot combustion gases and/or purge air into the fuel lines 230. A flow of purge air 295 may enter through the purge air intake valves 290. The flow of purge air 295 may include any type of media. The purge air 295 forces any liquid fuel downstream of the check valves 280 to flow through the nozzle intakes 130, 140 so as to be burned in the combustor 120. The flow of liquid fuel 110 upstream of the check valves 280 largely remains in the fuel lines 230, the primary fuel lines 240, and the secondary fuel lines 250. The flow of liquid fuel 110 within the gas turbine compartment 150 thus may rise to the temperature therein. As described above, decomposition may result given an extended amount of time at such elevated temperatures.

Figure 3:
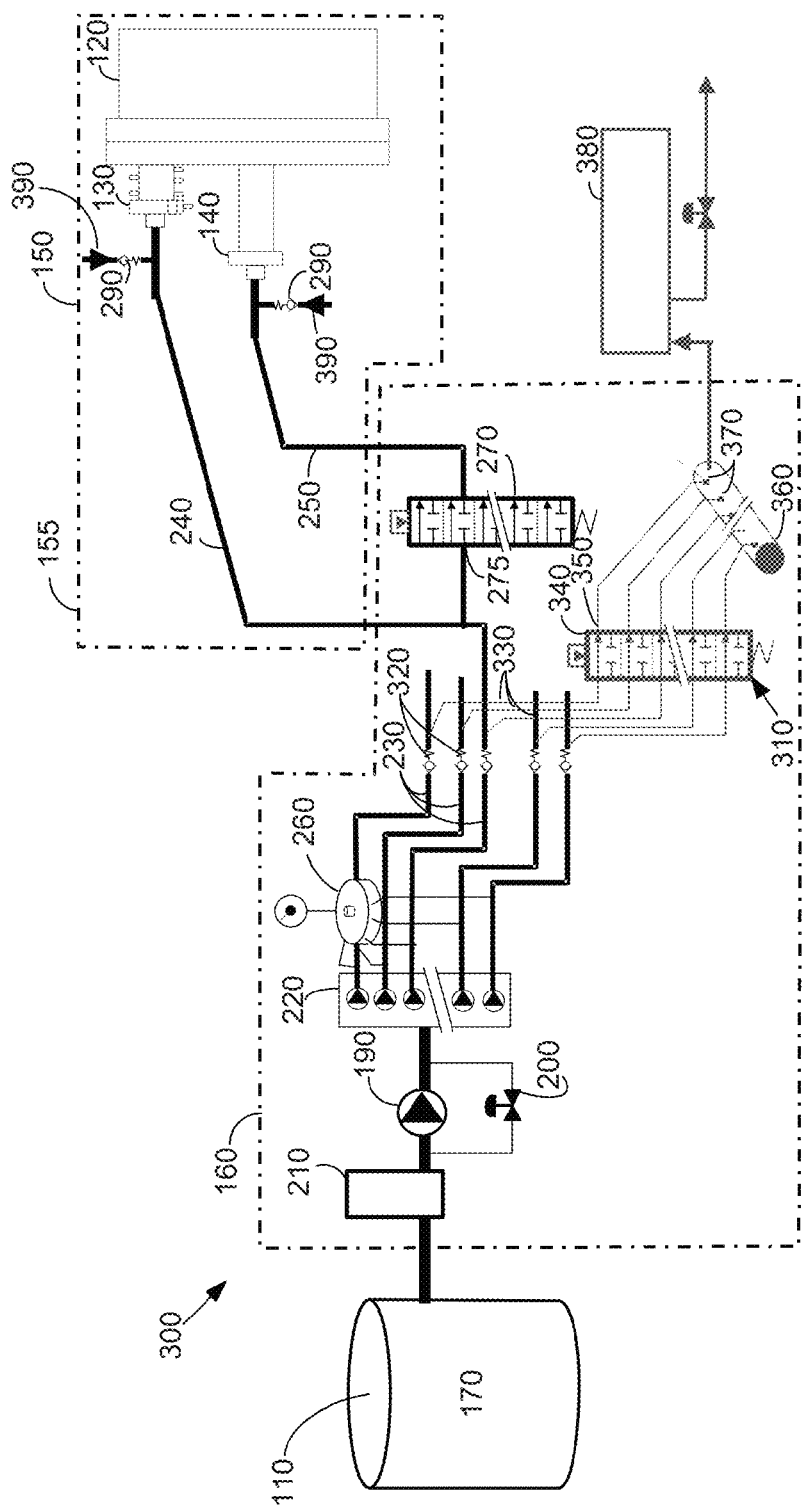
FIG. 3 is a schematic view of a liquid fuel system as may be described herein.

FIG. 3 is a liquid fuel system 300 as may be described herein. The liquid fuel system 300 is largely similar to the liquid fuel system 100 but with the addition of a purge air drain system 310. The purge air drain system 310 may have a check valve 320 positioned on the fuel lines 230 downstream of the flow divider 220 as opposed to the use of the check valves 280 positioned about the nozzle intakes 130, 140. A drain line 330 may tie into each fuel line 230 just downstream of the check valve 320. Other positions may be used. The drain lines 330 may in turn lead to a drain valve 340. The drain valve 340 may have a port 350 for each drain line 330. In this example, fourteen (14) ports 350 may be used. The drain valve 340 may open and shut the drain lines 330 as desired. Alternative, multiple one port drain valves 340 may be used such that each drain line 330 has a separate drain valve 340 thereon. Alternatively, a number of three way valves could be used in place of the check valve 320 and the drain port 350 of the drain valve 350.

A merged drain line 360 may be positioned downstream of the drain valve 340. The merged drain line 360 may have a flow control orifice 370 associated with each drain line 330. The flow control orifices 370 may be sized according to the desired flow rate therethrough. The merged drain line 360 may lead to a drain tank 380. The drain tank 380 may have a predetermined volume and any desired size or shape. The drain tank 380 may be pressurized so as to limit the discharge rate and quantity of the flow of liquid fuel 110. The drain tank 380 also may have a level switch therein so as to control the discharge quantity and rate. The drain tank 380 preferably is positioned apart from the gas turbine compartment 150 so as to avoid the heat therein. The drain tank 380 may be in communication with the liquid fuel container 170, the liquid fuel skid 160, the fuel lines 230, or otherwise so as to return the flow of liquid fuel 110.

In use, the pump 190 may be turned off when the combustors 120 switch from liquid fuel to gas and various control valves may be shut. The purge air intake 290 may be opened and a flow of purge air 390 pushes the residual flow of liquid fuel flow 110 into the nozzle intakes 130, 140 to be burned in the combustor 120 as is described above. The flow of purge air 390 may include any type of media. The drain valve 340 then may be opened such that the liquid fuel 110 within the fuel lines 230, 240, 250 flows under the force of gravity and with the aid of the purge air 390 into the drain tank 380. The discharge rate of the flow of liquid fuel 110 into the drain tank 380 may be limited by the size of the flow control orifices 370 about the merged drain line 360 as well as by the pressure within the drain tank 380.

The purge air also may be controlled in a manner that initially flows at a low rate to push slowly the liquid fuel into the combustor 120. This would prevent power surges from the gas turbine engine 10. After an initial purge, the flow rate may be increased to purge the residual liquid from the fuel line 230, 240, 250.

Purging the liquid fuel lines 230, 240, 250 may not be a continuous operation. Rather, the drain valve 340 may be sequenced to discharge any residual liquid fuel 110 from the hotter sections of the turbine compartment 150. (The purging of the nozzle intakes 130, 140 generally should be continuous.) The use of the purge air drain system 310 thus removes most of the flow of liquid fuel 110 away from the gas turbine compartment 150 so as to lessen the possibility of liquid fuel decomposition and the undesired consequences that may result therefrom.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

We claim:

1. A liquid fuel system for use with a flow of a liquid fuel and a combustor of a gas turbine engine, comprising:
   a plurality of fuel lines in communication with the combustor;
   a purge air inlet, in communication with a source of purge air, positioned about each of the fuel lines upstream of the combustor;
   a check valve positioned on each of the fuel lines upstream of the purge air inlet;
   a plurality of drain lines, wherein each drain line is in communication with a respective fuel line downstream of the check valve; and
   a plurality of drain valves, wherein each drain valve is in communication with a respective drain line and configured to allow liquid fuel in the respective fuel lines downstream of the check valve to drain via a flow of purge air through the purge air inlet and opening the drain valves.

2. The liquid fuel system of claim 1, wherein the combustor comprises a primary nozzle intake and a secondary nozzle intake, and wherein the plurality of fuel lines comprises a plurality of primary nozzle fuel lines and a plurality of secondary nozzle fuel lines.

3. The liquid fuel system of claim 1, further comprising a liquid fuel skid positioned apart from the combustor.

4. The liquid fuel system of claim 3, wherein the combustor is positioned within a compartment.

5. The liquid fuel system of claim 3, wherein the liquid fuel skid comprises a pump and a flow divider.

6. The liquid fuel system of claim 1, wherein the plurality of drain lines are in communication with a merged drain line.

7. The liquid fuel system of claim 6, wherein the merged drain line is in communication with a drain tank.

8. The liquid fuel system of claim 7, wherein the drain tank comprises a pressurized drain tank.

9. The liquid fuel system of claim 3, wherein the check valve is positioned on the liquid fuel skid.

10. The liquid fuel system of claim 4, wherein the check valve is positioned outside of the compartment.

11. The liquid fuel system of claim 7, wherein the drain tank is in communication with a liquid fuel container, a liquid fuel skid, or the fuel lines, and wherein the drain tank is configured to return the flow of liquid fuel to the liquid fuel container, the liquid fuel skid, or the fuel lines.

12. A method of protecting a flow of liquid fuel in a fuel line from the heat produced by a combustor of a gas turbine engine when the fuel line is not in use, comprising:
   positioning a purge air inlet about the fuel line upstream of the combustor
   positioning a check valve on the fuel line upstream of the purge air inlet;
   positioning a drain valve about the fuel line downstream of the check valve and at an elevation that is less than the combustor;
   forcing a flow of purge air through the purge air inlet and into the fuel line;
   opening the drain valve; and
   flowing the liquid fuel through the drain valve.

13. The method of claim 12, further comprising the step of flowing the liquid fuel to a drain tank.

14. The method of claim 13, further comprising the step of positioning the drain tank at a distance from the combustor.

15. The method of claim 13, further comprising the step of pressurizing the drain tank.

16. The method of claim 12, further comprising the step of returning the flow of fuel to the fuel line.

17. The method of claim 12, further comprising the step of opening and closing the drain valve in a repeated sequence.

18. A purge air drain system for use with a flow of a liquid in a liquid line, comprising:
   a purge air inlet, in communication with a source of purge air, positioned about the liquid line;
   a check valve positioned on the liquid line upstream of the purge air inlet;
   a drain line in communication with the liquid line downstream of the check valve; and
   a drain valve in communication with the drain line and configured to allow so as to drain the flow of liquid in the liquid line downstream of the check valve to drain via a flow of purge air through the purge air inlet and opening the drain valve.

19. The purge air drain system of claim 18, wherein the drain line is in communication with a drain tank.

20. The purge air drain system of claim 19, wherein the drain tank comprises a pressurized drain tank.

* * * * *

UNITED STATES PATENT AND TRADEMARK OFFICE
CERTIFICATE OF CORRECTION

| | | |
|---|---|---|
| PATENT NO. | : 8,783,007 B2 | Page 1 of 1 |
| APPLICATION NO. | : 12/773053 | |
| DATED | : July 22, 2014 | |
| INVENTOR(S) | : Julio E. Mestroni et al. | |

It is certified that error appears in the above-identified patent and that said Letters Patent is hereby corrected as shown below:

In the Claims:

In Column 5, Line 52, change "respective fuel lines" to -- respective fuel line --.

In Column 6, Line 54, change "to allow so as to drain the flow of liquid" to -- to allow liquid --.

Signed and Sealed this
Seventh Day of October, 2014

Michelle K. Lee
*Deputy Director of the United States Patent and Trademark Office*